F. C. OSBORN.
MACHINE FOR MAKING SPIRALLY WOUND TUBES.
APPLICATION FILED JUNE 28, 1909.
1,006,976.
Patented Oct. 24, 1911.
7 SHEETS—SHEET 2.
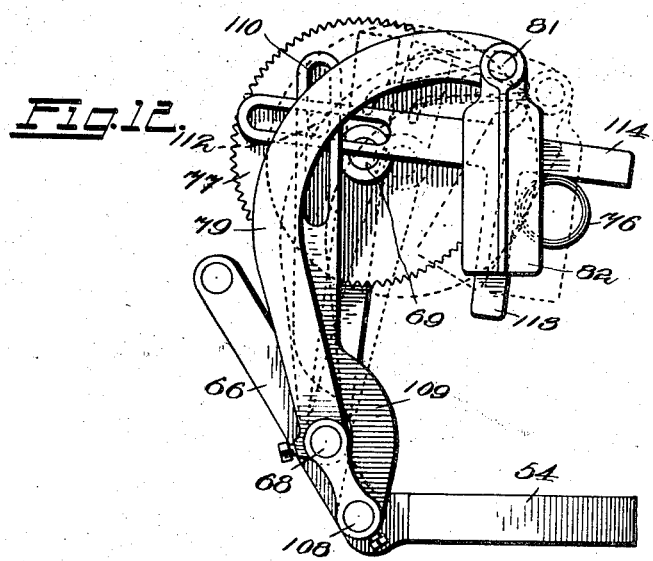
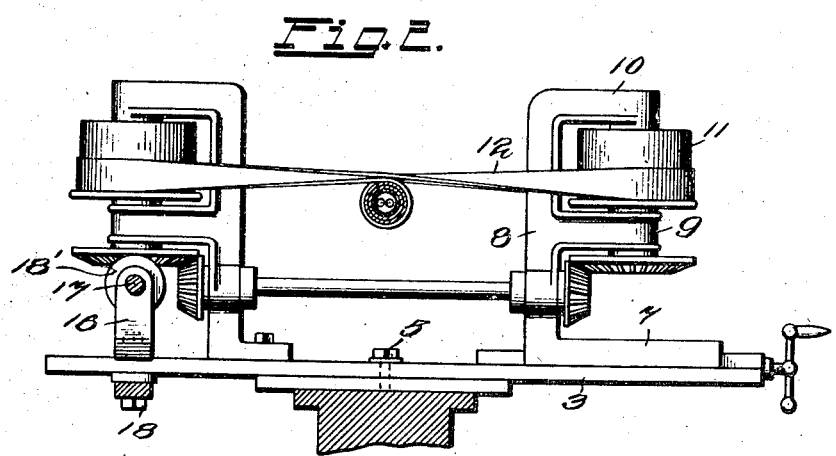
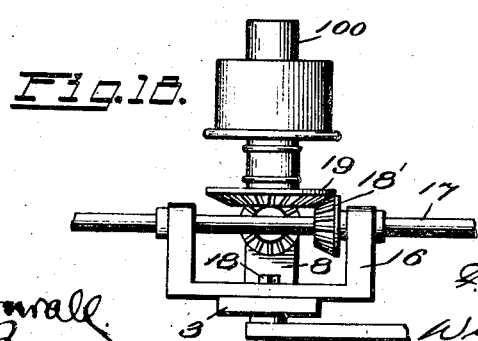
Witnesses
Inventor F. C. OSBORN.
MACHINE FOR MAKING SPIRALLY WOUND TUBES.
APPLICATION FILED JUNE 28, 1909.

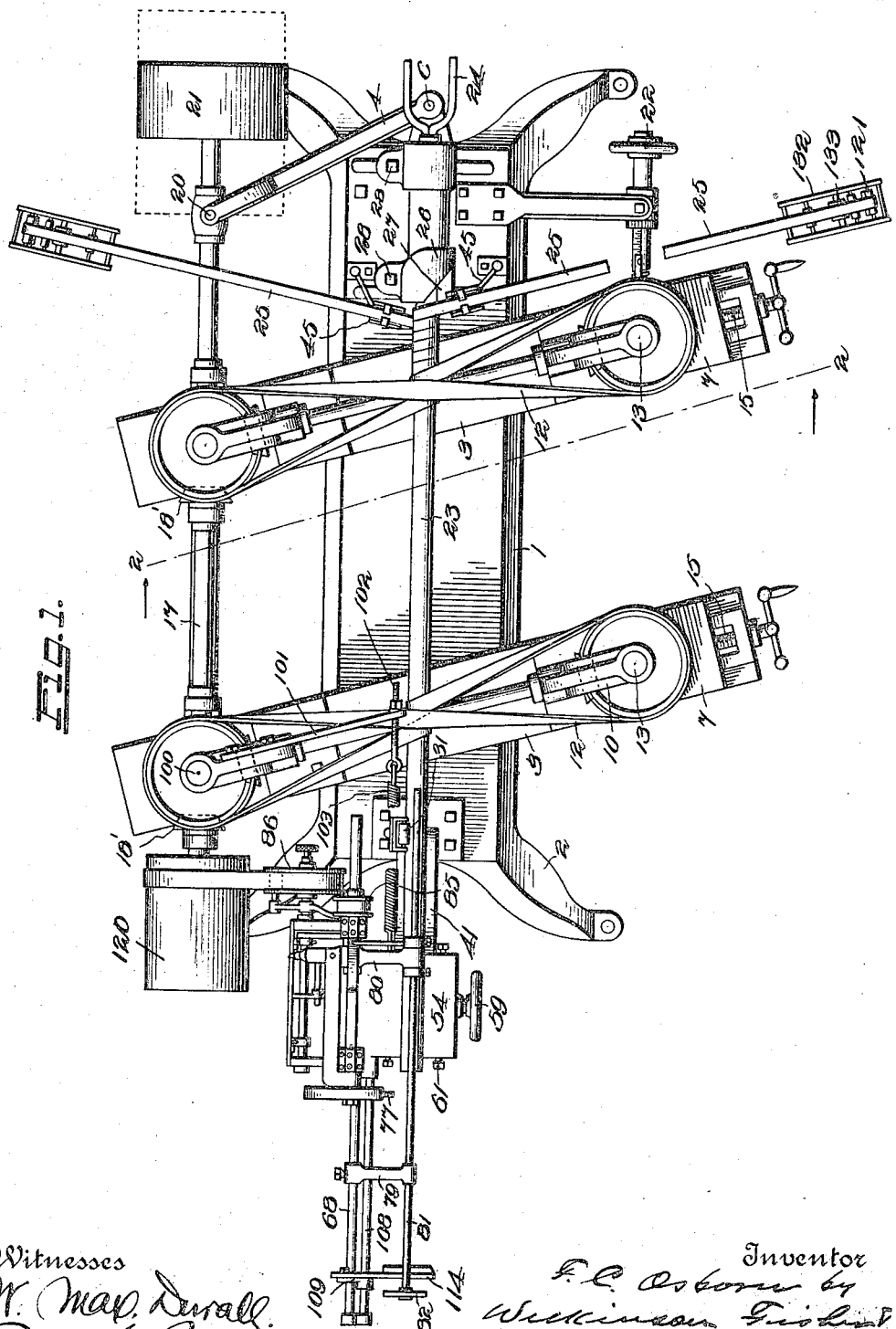

1,006,976. Patented Oct. 24, 1911.

7 SHEETS—SHEET 3.

Witnesses
Inventor
Attorneys

F. C. OSBORN.
MACHINE FOR MAKING SPIRALLY WOUND TUBES.
APPLICATION FILED JUNE 28, 1909.
1,006,976.
Patented Oct. 24, 1911.
7 SHEETS—SHEET 4.
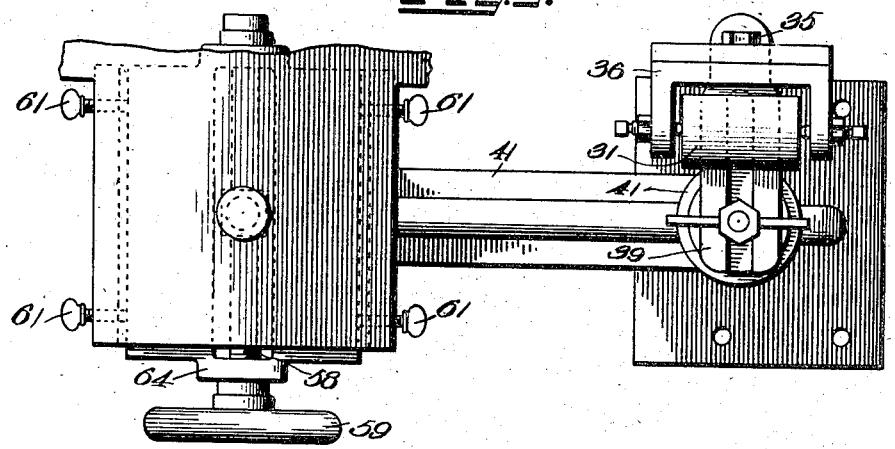
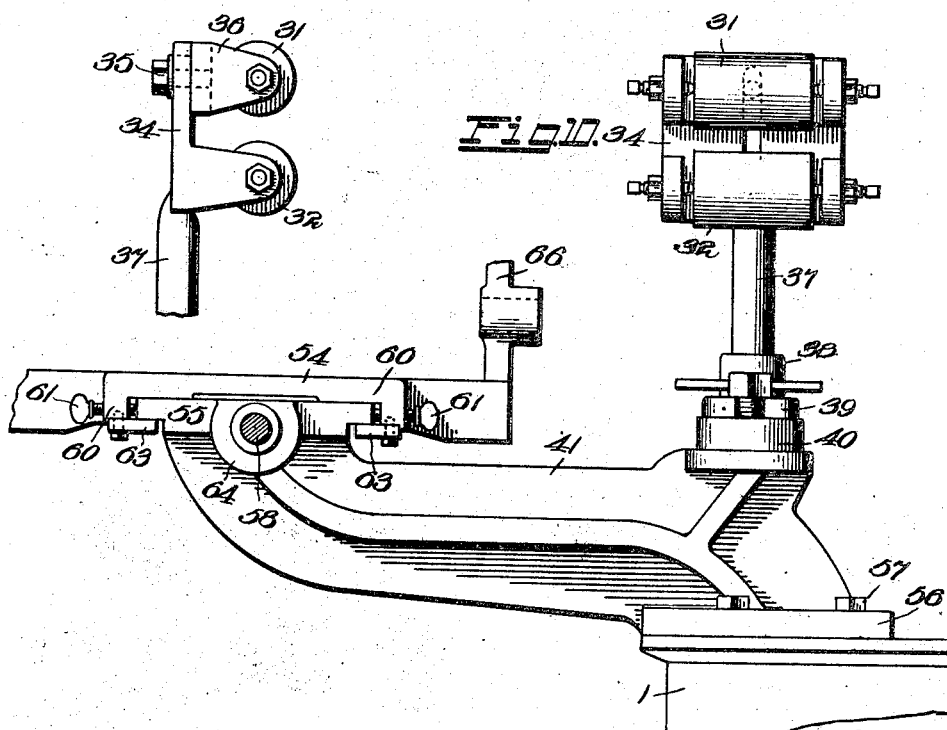

F. C. OSBORN.
MACHINE FOR MAKING SPIRALLY WOUND TUBES.
APPLICATION FILED JUNE 28, 1909.
1,006,976.
Patented Oct. 24, 1911.
7 SHEETS—SHEET 5.
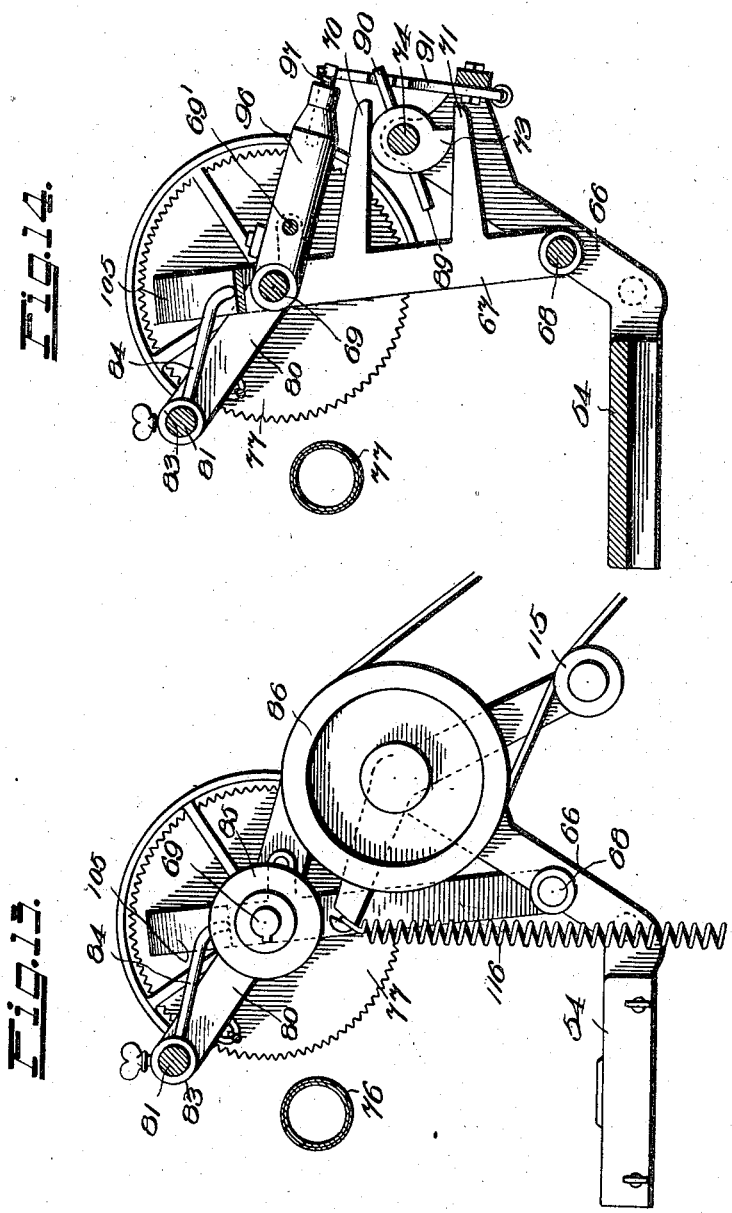

F. C. OSBORN.
MACHINE FOR MAKING SPIRALLY WOUND TUBES.
APPLICATION FILED JUNE 28, 1909.
1,006,976.
Patented Oct. 24, 1911.
7 SHEETS—SHEET 6.
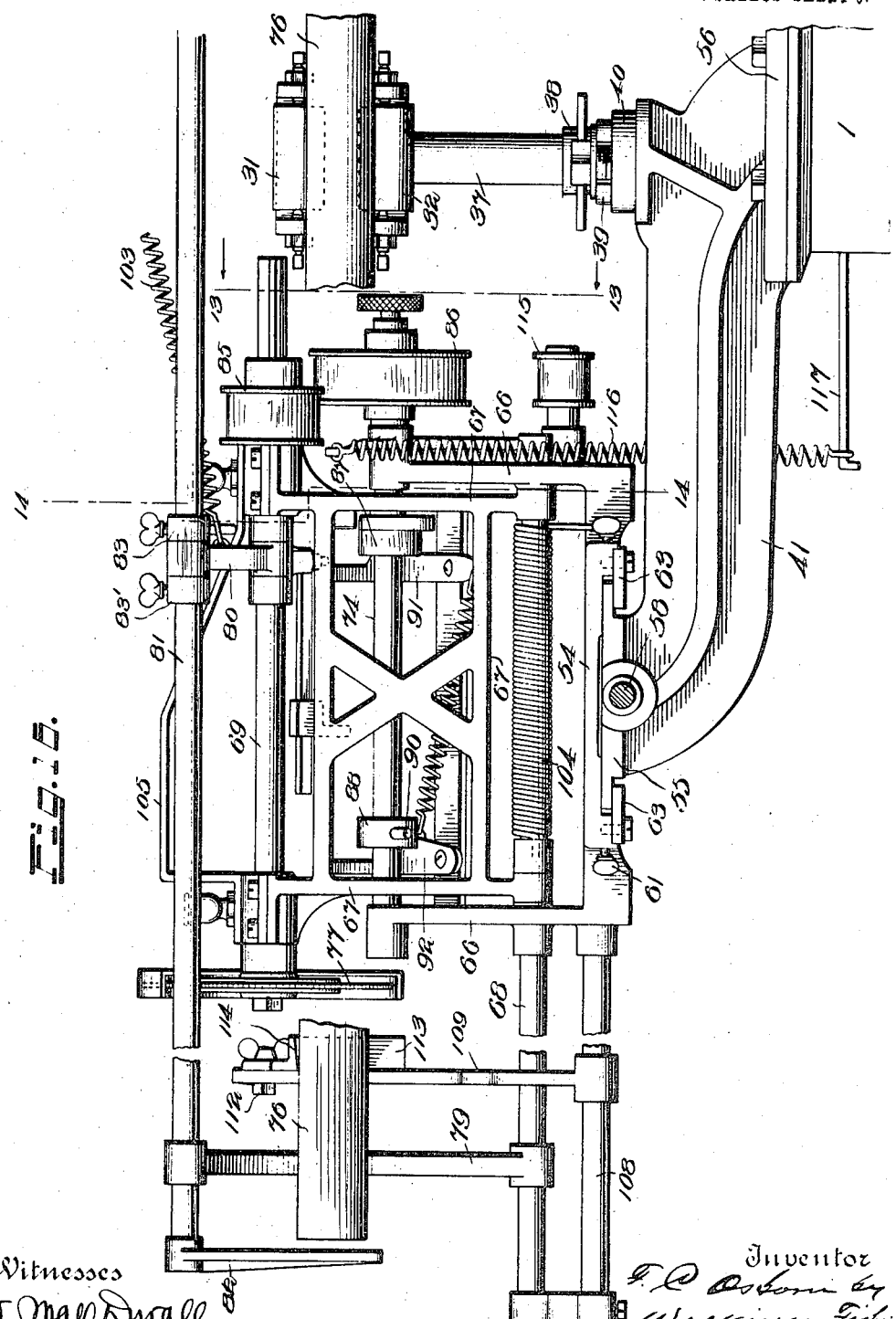
Witnesses
Inventor
Attorneys

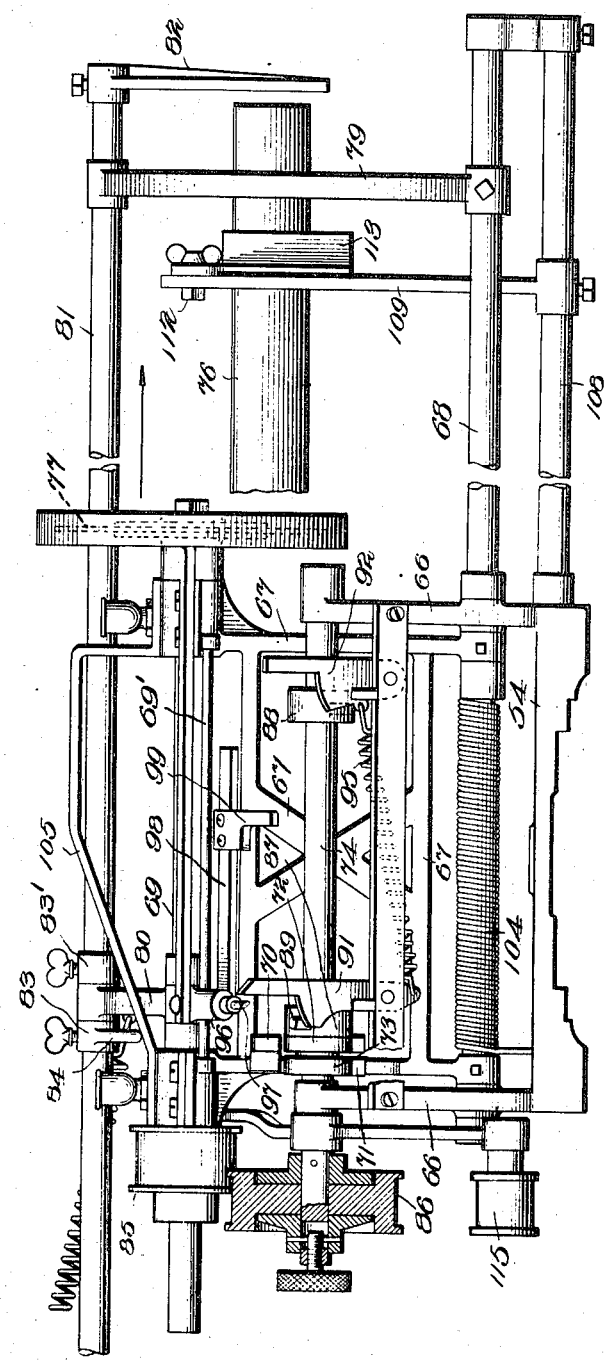

UNITED STATES PATENT OFFICE.

FRANCIS C. OSBORN, OF DETROIT, MICHIGAN, ASSIGNOR TO SINGLE SERVICE PACKAGE CORPORATION OF AMERICA, OF NEW YORK, N. Y., A CORPORATION OF NEW JERSEY.

MACHINE FOR MAKING SPIRALLY-WOUND TUBES.

1,006,976.        Specification of Letters Patent.        Patented Oct. 24, 1911.

Application filed June 28, 1909. Serial No. 504,915.

*To all whom it may concern:*

Be it known that I, FRANCIS C. OSBORN, a citizen of the United States, residing at Detroit, in the county of Wayne and State of Michigan, have invented certain new and useful Improvements in Machines for Making Spirally-Wound Tubes; and I do hereby declare the following to be a full, clear, and exact description of the invention, such as will enable others skilled in the art to which it appertains to make and use the same.

This invention relates to that type of machines by which continuous strips or bands of paper, or other material are coiled spirally around a mandrel, cemented together, formed into continuous tubes and finally cut off into predetermined lengths.

The objects of the present invention are to improve machines of this class by preventing the mandrel from sagging when in use, and at the same time permitting the paper tube to slide more freely thereover; to provide an improved means for adjusting the belts passing over said mandrel, as well as for adjusting the saw frame; and to make other improvements on these machines as will appear more fully hereinafter.

To these ends my invention consists in the novel combinations of parts and details of construction more fully hereinafter disclosed and particularly pointed out in the claims.

Figure 3:
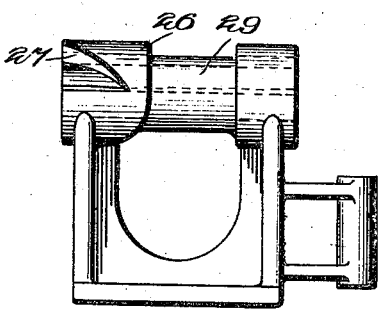
Figure 4:
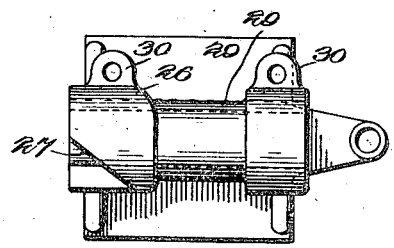
Figure 5:
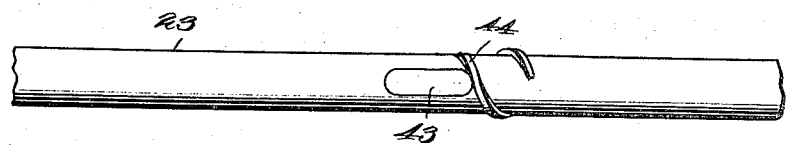
Figure 6:
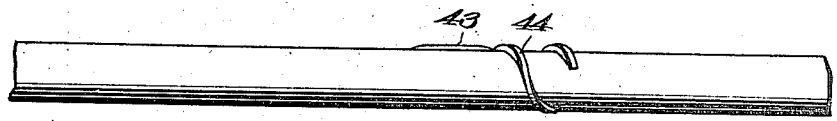
Figure 7:
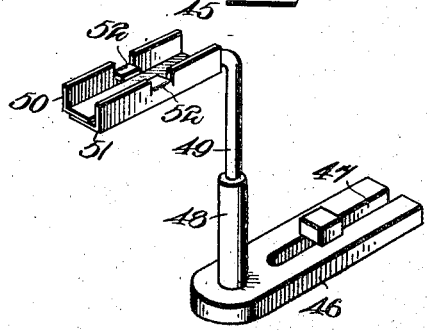
Figure 15:
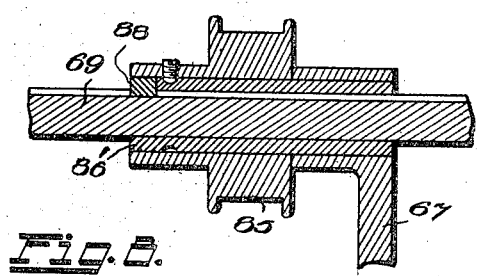
Figure 8:
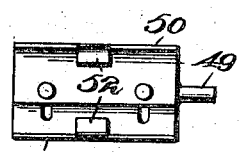

Referring to the accompanying drawings forming a part of this specification in which like numerals refer to like parts in all the views:—Figure 1, is a plan view of the machine; Fig. 2, a sectional elevation thereof on the line 2—2 of Fig. 1; Fig. 3, a detail elevational view; Fig. 4, a plan view of the head of the machine, while Figs. 5 and 6 are detail views of the mandrel; Figs. 7 and 8, views showing the guide for the paper strips; Fig. 9, is a detail plan view of the supporting rollers for the tube covered mandrel and the adjacent parts; Fig. 10, an elevational view of the same; Fig. 11, an end elevational view of the rollers detached; Fig. 12, is an end elevation of the automatic saw cut off mechanism, viewed from the cutting end of the machine; Fig. 13, a similar view taken on the line 13—13 of Fig. 16, when seen from the opposite or driving end of the machine; Fig. 14, a sectional detail view of the saw mechanism taken on the line 14—14 of Fig. 16, showing the operating cams; Fig. 15, is a sectional view of the driving pulley of the saw; Fig. 16, a side elevation of the said saw cutting off mechanism when viewed from the tube side of the machine; Fig. 17, a like view when seen from the side of the machine opposite the tube; Fig. 18, a detail of one of the belt pulleys showing an extension of the pulley bracket.

1, represents the base of the machine which may be similar to a lathe bed, and is preferably supported by the legs 2. On this bed are pivoted the bed pieces 3, and the swinging arm 4; the pivots 5, of the bed pieces, see Fig. 2, and the pivot 6 of the arm being in line with each other all as heretofore. To one end of each of the bed pieces is secured the usual slidable supports 7, which are provided with the improved upright member 8, having the horizontally projecting members 9 and 10, between which are located the pulleys 11, for the belts 12, and through which pass the shafts 13 for said pulleys, as shown. The distance between each pair of pulleys 11, that are located on the same bed plate may be adjusted by means of the screw 15, in the customary manner. At one end of the bed plate is the journal bracket 16, of the shaft 17, see Figs. 2 and 18, which bracket is pivoted on the bolt 18, passing through the parts 3 and 16, as shown.

The shaft 17 carries the bevel gears 18' which mesh with the bevel gears 19 on the lower ends of the pulley shafts 13, as illustrated; is pivotally connected at 20, to the swinging arm 4, see Fig. 1, and carries at its extreme end the power pulley 21, all as is well known in this type of machine. 22 likewise represents the well known means for adjusting the angular relation of the bed plates 3, and therefore that of the belts 12, to the mandrel 23; and 24 represents the well known heating pipes for the interior of said mandrel.

It is well known in machines of this class, that the paper or other strips 25 suitably prepared are fed to the mandrel 23, are gripped by the belts 12 and formed into tubes which must be forced out by the action of the belts over the unsupported end of the mandrel, when they are automatically cut off into suitable predetermined lengths. In making very small tubes, however, correspondingly small mandrels are employed, and if these mandrels, as well as others, are not suitably supported near the points at which the belts exert their pressure they are apt to sag and give trouble. In order to overcome this defect, the head 26, in which the mandrel is secured is cut away at 27, in order that the strip 25 may pass thereover, no matter what its inclination to the mandrel may be, and thereby permit the belts 12, to grip the tube covered mandrel at a point much closer to said supporting head than has been possible heretofore. This greatly lessens the liability of said mandrel to sag under the pressure of the first pair of belts. The mandrel is preferably clamped in said head by the tightening bolts 28, passing through the lugs 30 that draw together the sides of said head which are separated by the slit 29, shown in dotted lines in Figs. 3 and 4. In order to prevent the mandrel from sagging at the outer, unsupported end, under the pressure of the second pair of belts, there is provided the adjustable supporting rollers 31 and 32, see Figs. 9, 10 and 11, which bear from above and below against one side of the tube covered mandrel, as the tube is forced past said rollers and therefore the pressure of the belts, to a great extent, is taken by said rollers. In order to adapt these rollers to mandrels of different sizes they are supported by a slotted piece 34; and the upper roller 31 is made adjustable to and from the lower roller 32, by mounting it on the bracket 36, which is adjustable on the said support 34, as shown. The support 34, itself is carried by the stem 37, which is adjustable up and down in a socket 38 which socket is provided with the slotted foot 39, itself longitudinally adjustable on the boss 40, rigid with the saw frame arm 41. By means of the several adjustments described, it is evident that the supporting and steadying rollers 31 and 32 may be adjusted to mandrels of any size and of any degree of flexure.

After the mandrel has been properly supported to prevent flexure, as above described, it is desirable to provide means by which the paper tube may, especially if it is to be formed from thin paper, be made slightly larger than the mandrel, so it will easily slip off the same. To these ends there is provided on the mandrel, as shown in Figs. 5 and 6, an enlarging plate 43, preferably consisting of a thin piece of steel or other material, suitably secured to the mandrel, and extending longitudinally thereof a distance beyond the spiral guide 44, of about one and one-half times the width of the paper strips to be wound thereover. The edges of this plate are filed down to a taper in order to avoid any shoulders, and one end abuts the spiral guide 44 which is formed of a strip of suitable material, preferably steel, wound around the mandrel, suitably secured thereto and having a pitch equal to that which the paper strips are to have in the finished tube and a length sufficient to cause its ends to slightly overlap. The edge of the paper strips 25 constantly abuts this spiral in the well known manner, and it therefore constitutes a continuous guide for the same. The strips 25 are further guided in their passage to the mandrel by the adjustable guides 45, each consisting of an adjustable base 46, provided with the slot 47, and the socket 48, into which fits the stem 49, to which is attached the flanged guide member 50 adjustably associated with the complementary member 51, and each of which members is or may be provided with a turned over guide tip 52, beneath which the paper strip passes, as shown. The structure and adjustments of these guides are such as to insure the certain and easy passage of the strips to their proper positions on the mandrel, no matter what their size may be.

It is very desirable in machines of this type to be able to adjust the saw frame while the machine is in operation, and thereby insure the proper working of the saw by bringing the saw support nearer to or farther away from the tubes to be cut; and also to enable the saw when it is operated by the mechanism disclosed below to cut such tubes at varying angles. To these ends in Figs. 9 and 10, there is illustrated a saw frame 54, mounted on the flange 55 of the arm 41, which arm is attached to the bed 1, of the machine, by suitable means as a plate 56 and bolts 57.

Passing through the upper end of the arm 41 through a lug 64, on the frame 54, is an adjusting screw 58, controlled by the wheel 59, which is adapted to adjust said saw frame longitudinally of the machine. And passing through the flange 60 of the frame 54, and abutting the said flange 55, are the adjusting screws 61, which serve to so adjust said saw frame as to make different angles with the axis of the machine. In order to hold said frame 54 in sliding relation with the flange 55, clips 63 are provided therefor, as shown. It is evident that each of the above adjustments of the frame, as well as of the saw itself caused thereby, may be had while the machine is in operation.

The saw cutting off mechanism, by which the saw is automatically brought into contact with the tube 76, is best illustrated in Figs. 12 to 17, and comprises the two arms 66 attached to or integral with the frame, or table 54; and through these arms passes the rod 68 and between the same is pivoted on said rod the frame 67, as plainly shown in Figs. 16 and 17. In the upper part of the frame 67 is journaled the arbor 69 which is slidable in its bearings and which carries the saw 77, for automatically cutting off predetermined lengths of tubing 76, as fast as it is formed. Projecting from one side of the frame 67, are the arms 70 and 71, see Figs. 14 and 17, adapted to be struck by the cams 72 and 73, respectively, mounted on the shaft 74, passing through the upper extremities of the arms 66, all as will be more fully disclosed below.

Referring again to Figs. 16 and 17, it will be observed that the shaft 68, also carries an arm 79 near its outer end, that the sliding arbor 69 on which the saw is mounted carries a short arm 80, which is adapted to slide on rod 69′ fixed to the frame, and passing through the said arms 79 and 80 is a rod 81, carrying the plate, or projection 82 against which the tube 76 strikes as it is forced toward the left, as seen in Fig. 16, by the belts 12 of the machine. Collars 83 and 83′ are secured to the rod 81 by set screws on each side of the arm 80, and projecting from the collar 83, is the short arm or stud 84, as best seen in Figs. 13 and 14, for a purpose to be presently stated. It follows from the construction so far described, that when the tube 76 strikes the projection 82, it will push the rod 81 longitudinally of the machine, and cause the same to carry with it the arm 80, and the arbor 69, to which it is attached; whereupon the saw attached to said arbor will move longitudinally of the machine in the manner well known in this art. The said saw arbor 69, is driven by a belt from any suitable source, passing over the pulley 85, on the sleeve 86′, see Fig. 15, journaled in a bearing of the frame 67. A feather 88 in a slot in the arbor 69 forms a sliding driving connection between said pulley and said arbor.

Mounted on the end of the shaft 74 carrying the cams 71 and 72 is the clutch pulley 86 having a well known friction connection with said shaft and receiving power from any suitable source, such as the pulley 120, driven by the shaft 17; and also mounted on this shaft 74 are the two collars 87 and 88 carrying the pins 89 and 90 respectively, located 180° apart, and adapted to engage the pivoted dogs 91 and 92 respectively, as the shaft revolves. These dogs are held in the path of said pins by means of the spring 95, as shown. Connected to the shaft 81 by the arm 80 and sliding on the shaft 69, is also a projection 96, carrying a spring pressed beveled dog or finger 97, adapted to strike the upper end of said dog 91 and turn it on its pivot when the saw is carried to the right, as seen in Fig. 17; but adapted to yield and pass by the beveled upper end of said dog when the saw is moved in the opposite direction. Extending from said projection 96, is also a rod 98, carrying an adjustable toe 99 adapted to strike the upper end of the dog 92, and likewise turn it on its pivot as the saw continues to move in the same direction, Extending from said projection 96, is also a rod 98, carrying an adjustable toe 99 adapted to strike the upper end of the dog 92, and likewise turn it on its pivot as the saw continues to move in the same direction, all as is well known. It is evident that the action of this part of the mechanism so far as now described will be as follows:—

Power being continuously applied to the friction clutch pulley 86, suppose the tube 76 causes the saw to move in the direction of the arrow in Fig. 17, the dog 91, will release the pin 89, the shaft 74 will make a half revolution, and be stopped by the pin 90 coming in contact with the dog 92. When this happens the cam 72 carried by said shaft strikes the arm or projection 70 on the frame 67, forcibly turns said frame on its pivot 68, and throws the saw in contact with the said tube 76, while it is still traveling with the tube, in the direction of the arrow. Power being continuously applied to the pulley 85, the saw is continuously rotated, and therefore the tube is severed while this longitudinal motion of the saw continues. The parts are so timed by adjusting the toe 99, that when the severance of the tube is completed the said toe strikes the dog 92, releasing the pin 90, and permitting the other cam 73 carried by the shaft 74, to restore the frame to the position shown in Fig. 14, by its contact with the arm 71, whereupon the saw will be automatically moved back longitudinally of the machine to its former position by the mechanism now to be described.

Referring to Figs. 1 and 18, it will be observed that one of the pulley brackets or shafts is provided with an extension 100, on which is mounted an arm 101, carrying at its end an adjustable connection 102, with the spring 103, secured to the arm 80, movable with the saw. Therefore, when the saw is moved in one direction by the tube 76, this spring is extended, and when the saw is released from the tube, by the cam 73, said spring immediately returns said saw to its initial position, ready to be again moved against the tension of said spring when the tube grows to a sufficient length.

It sometimes happens in machines of this type, especially when the tube reaches the saw in a soft condition, owing to the quantity of glue employed, or to other causes, that the saw fails to cut the tube properly, and the section of the tube cut off, also sometimes gets jammed between the plate 82 and the saw, or between said plate and the end of the advancing tube, whereupon the cut off section of tubing fails to fall at the proper time and clear said plate for the next operation. To avoid these defects, and to render the action of the whole cutting off mechanism more perfect, there is provided a strong torsional spring 104, to insure the quick and early movement of the saw back and away from the tube. This spring supplements the action of the cam 73, which must of necessity be somewhat slow in its earlier stages in order to avoid shock. There is also provided the following means for positively swinging the plate 82 away from the end of the tube; secured to the top of the frame 67 is the cam plate 105, on which the toe or arm 84 reciprocates. As above stated, this toe is made fast to the shaft 81 by the collar 83, and therefore when it rides up the cam, it causes said shaft to rotate on its axis, and said plate 82 to swing out of the way of the end of the tube. In addition to this, there is provided the rod 108, secured to the frame 54, carrying the upright 109, slotted at 110, to which is adjustably secured at 112, the transverse slotted piece, provided with the right angled extensions 113 and 114, which straddle the tube, as best shown in Fig. 12. As the saw moves from its dotted line to its full line position, shown in said figures, the extensions 113 and 114, prevent the tube from following, and thereby serve as strippers. A belt tightener 115 is mounted on the frame 66, see Fig. 13, and is controlled by the spring 116, made fast to the main frame of the machine, as shown at 117.

In making paper tubes on this type of machine, it is very desirable to coat the strips 25 with suitable adhesives, or other substances before they are fed to the mandrel, and in Fig. 1, is diagrammatically shown a device for applying glue or other material to said strips as they come from the rolls 121 in which they are wound.

132 represents the glue tank, and 133 a glue applying roller on which the strips 25 pass.

It will thus be seen that in this improved machine for making spirally wound tubes there is provided a novel construction of head by which the mandrel is more efficiently braced and prevented from sagging; there is provided a novel adjustable means for further bracing and supporting the outer end of different sizes of tube covered mandrels which further prevents sagging; there is provided a novel means for making the tube slightly larger than the mandrel, and also a simplified paper guide; there is provided an improved vertical bracket for carrying the pulleys for the tube winding belts.

The several novel features to the tube severing mechanism herein disclosed and not claimed are made the subject of my co-pending application No. 552,241, filed March 29, 1910, and the novel features relating to the glue applying device are made the subject of my application No. 534,840, filed December 24, 1909.

What I claim is:—

1. In a tube winding machine for spirally winding strips of material, the combination of a mandrel; a support therefor in which said mandrel is clamped provided with lugs 30, tightening bolts, and a cut away portion adapted to receive one of said strips; and a belt for winding said strips passing over said mandrel and strips to one side of said cut away portion, substantially as described.

2. In a tube winding machine for spirally winding strips of material, the combination of a mandrel; a support therefor provided with a cut away portion adapted to receive one of said strips; means comprising a belt for winding said strips passing over said mandrel and strips to one side of said cut away portion; additional means for winding said strips and feeding forward the formed tube, passing over said mandrel to one side of and spaced apart from said first mentioned means; and means for supporting the tube covered mandrel located at one side of said additional means, substantially as described.

3. In a machine for spirally winding strips of material into tubes, the combination of a mandrel; a support therefor at one end; a belt passing over and around said mandrel adapted to form a tube thereon; and an additional support comprising a pair of vertically spaced rollers contacting with one side of the tube covered portion of said mandrel adapted to leave the other side free, substantially as described.

4. In a machine for spirally winding strips of material into tubes, the combination of a mandrel; a support therefor at one end, provided with a cut away portion to receive one of the strips; a winding belt passing over said mandrel in close proximity to said cut away portion; said support located outside of the portion covered by the tube; a second winding belt passing over the tube covered portion of the mandrel; and a support for the mandrel located to one side of said second belt and contacting with said tube covered portion of the mandrel, substantially as described.

5. In a machine for spirally winding strips of material into tubes, the combination of a mandrel; means comprising a belt passing over and around said mandrel for forming a tube thereon; a support contacting with one side of the tube covered portion of the mandrel comprising a pair of vertically spaced rollers; and means to adjust said rollers, substantially as described.

6. In a machine for spirally winding strips of material into tubes, the combination of a mandrel; means comprising a plurality of winding belts passing over said mandrel for forming a tube thereon; and a support contacting with the tube covered portion of the mandrel comprising a plurality of rollers; and a standard on which they are adjustably mounted, substantially as described.

7. In a machine for spirally winding strips into tubes, the combination of a mandrel; a plurality of winding belts passing over said mandrel; a support for said mandrel near each of said belts; a plurality of brackets each provided with horizontal members; a pair of pulleys around which each of said belts pass and mounted between said members; a shaft for each of said pulleys; a gear upon each of said shafts; connections between the gears of the shafts in each pair of pulleys; pivoted supports 3, upon which the brackets of each pair of pulleys are mounted; a connection 17 between said supports 3, means for adjusting one pulley of each pair toward and away from said mandrel; and means for swinging each of said supports on their respective pivots, substantially as described.

8. In a machine for spirally winding strips of material into tubes, a mandrel provided with an enlarging plate 43, secured to the same; and a spiral guide 44 in close proximity to said plate and means for passing a plurality of strips around said mandrel and over said plate, substantially as described.

9. In a machine for spirally winding strips of material into continuous tubes, a mandrel provided with an enlarging plate 43 of thin material having its edges tapered, and extending along the mandrel a distance sufficient to form a portion of the tube thereon; and a spiral guide for said plate, substantially as described.

10. In a mandrel for spirally winding strips of material into continuous tubes, the combination of a mandrel provided with an enlarging plate 43 of thin material having its edges tapered, and extending along the mandrel a distance sufficient to form a portion of the tube thereon; a spiral guide for said plate; and adjustable guides 45 for controlling said strips before they reach said mandrel, substantially as described.

11. In a machine for spirally winding strips of material into tubes, guides 45 for said strips comprising an adjustable base 46; a socket on said base; a stem fitting the socket; a flanged guide member 50 rigid with the stem; an adjustable guide member 51 carried by said member 50; and turned over guide tips 52 rigid with each of said guide members, substantially as described.

In testimony whereof, I affix my signature, in presence of two witnesses.

FRANCIS C. OSBORN.

Witnesses:
 HENRY E. VILLEROT,
 H. W. DRENGBERG.